(12) United States Patent
Komuro

(10) Patent No.: US 10,900,560 B2
(45) Date of Patent: Jan. 26, 2021

(54) SHIFT CONTROL DEVICE

(71) Applicant: SUBARU CORPORATION, Tokyo (JP)

(72) Inventor: Masaki Komuro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/590,638

(22) Filed: Oct. 2, 2019

(65) Prior Publication Data

US 2020/0158233 A1   May 21, 2020

(30) Foreign Application Priority Data

Nov. 20, 2018   (JP) ................. 2018-217570

(51) Int. Cl.

| | |
|---|---|
| *F16H 61/16* | (2006.01) |
| *F16H 59/36* | (2006.01) |
| *F16H 59/44* | (2006.01) |
| *F16H 59/50* | (2006.01) |
| *F16H 59/04* | (2006.01) |
| *F16H 61/66* | (2006.01) |
| *F16H 61/02* | (2006.01) |

(52) U.S. Cl.
CPC .......... *F16H 61/16* (2013.01); *F16H 59/044* (2013.01); *F16H 59/36* (2013.01); *F16H 59/44* (2013.01); *F16H 59/50* (2013.01); *F16H 61/0204* (2013.01); *F16H 61/66* (2013.01); *F16H 2059/366* (2013.01); *F16H 2061/166* (2013.01); *F16H 2061/6615* (2013.01)

(58) Field of Classification Search
CPC .......... F16H 61/16; F16H 59/36; F16H 59/44; F16H 59/50; F16H 59/044; F16H 61/66; F16H 61/0204; F16H 2061/6615; F16H 2059/366; F16H 2061/166; F16H 59/42; F16H 59/40; F16H 61/0213; F16H 61/662
See application file for complete search history.

(56) References Cited

U.S. PATENT DOCUMENTS

| | | | | |
|---|---|---|---|---|
| 4,543,855 A | * | 10/1985 | Oetting ................. | B60W 10/06 477/111 |
| 2017/0130833 A1 | * | 5/2017 | Kikkawa ................ | F16H 59/42 |
| 2019/0162303 A1 | * | 5/2019 | Kato ....................... | F16H 61/66 |

FOREIGN PATENT DOCUMENTS

| | | |
|---|---|---|
| JP | 2005-113946 A | 4/2005 |
| JP | 2014-88907 A | 5/2014 |
| JP | 2016-166647 A | 9/2016 |

* cited by examiner

*Primary Examiner* — Justin Holmes
(74) *Attorney, Agent, or Firm* — Troutman Pepper Hamilton Sanders LLP

(57) ABSTRACT

A shift control device includes: a stepless shift controller executing a stepless shift mode and controlling a transmission gear ratio of a continuously variable transmission in a stepless fashion; a stepped shift controller executing a stepped shift mode and controlling the continuously variable transmission using fixed transmission gear ratios; a mode setting unit switching the shift mode to the stepped shift mode when a vehicle is to be accelerated; and a transmission-gear-ratio setting unit setting an initial transmission gear ratio in the stepped shift mode when the shift mode is to be switched to the stepped shift mode. The transmission-gear-ratio setting unit estimates a variation in an engine rotation speed when the shift mode is to be switched to the stepped shift mode, and sets a fixed transmission gear ratio, at which the variation is greater than or equal to a lower limit value, as the initial transmission gear ratio.

20 Claims, 15 Drawing Sheets

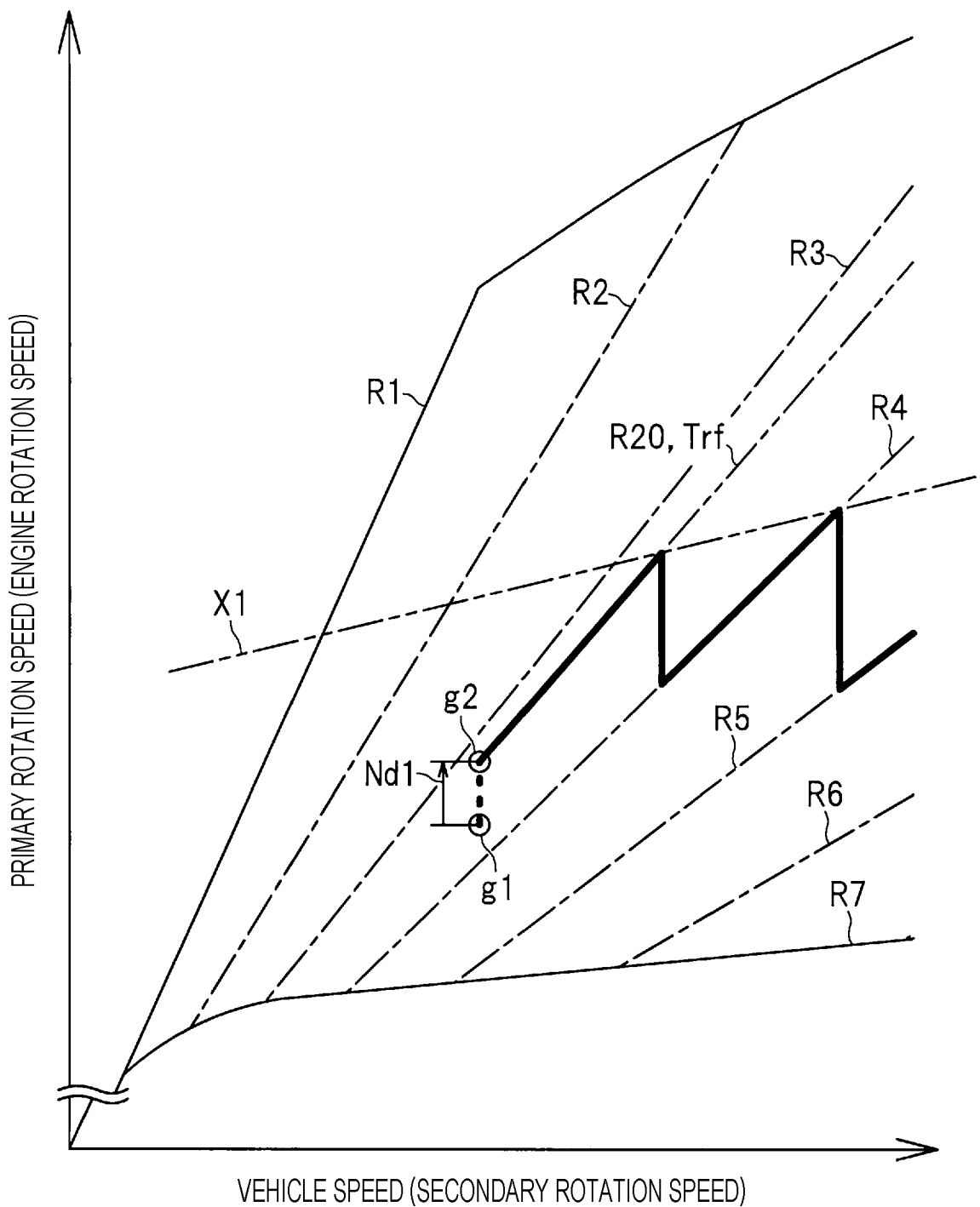

SHIFT CONTROL DEVICE

CROSS-REFERENCE TO RELATED APPLICATIONS

The present application claims priority from Japanese Patent Application No. 2018-217570 filed on Nov. 20, 2018, the entire contents of which are hereby incorporated by reference.

BACKGROUND

The disclosure relates to shift control devices that control continuously variable transmissions.

Continuously variable transmissions having, for example, primary pulleys and secondary pulleys are known as transmissions installed in automobiles. Shift modes of continuously variable transmissions include a stepless shift mode in which the transmission gear ratio is controlled in a stepless fashion and a stepped shift mode in which the transmission gear ratio is controlled in a stepwise fashion (see Japanese Unexamined Patent Application Publication Nos. 2005-113946, 2014-88907, and 2016-166647).

SUMMARY

An aspect of the disclosure provides a shift control device configured to control a continuously variable transmission to be coupled to an engine. The shift control device includes a stepless shift controller, a stepped shift controller, a mode setting unit, and a transmission-gear-ratio setting unit. The stepless shift controller is configured to execute a stepless shift mode as a shift mode and to control a transmission gear ratio of the continuously variable transmission in a stepless fashion. The stepped shift controller is configured to execute a stepped shift mode as a shift mode and to control the continuously variable transmission using a plurality of fixed transmission gear ratios. The mode setting unit is configured to switch the shift mode from the stepless shift mode to the stepped shift mode when a vehicle is to be accelerated in accordance with an operation performed on an accelerator pedal. The transmission-gear-ratio setting unit is configured to set an initial transmission gear ratio as a first target transmission gear ratio in the stepped shift mode when the shift mode is to be switched from the stepless shift mode to the stepped shift mode. The transmission-gear-ratio setting unit estimates a variation in an engine rotation speed when the shift mode is to be switched from the stepless shift mode to the stepped shift mode, and sets a fixed transmission gear ratio, at which the variation in the engine rotation speed is greater than or equal to a lower limit value, as the initial transmission gear ratio.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 15 illustrates another example of a shift situation when the shift mode is switched from the stepless shift mode to the stepped shift mode.

DETAILED DESCRIPTION

Figure 1:
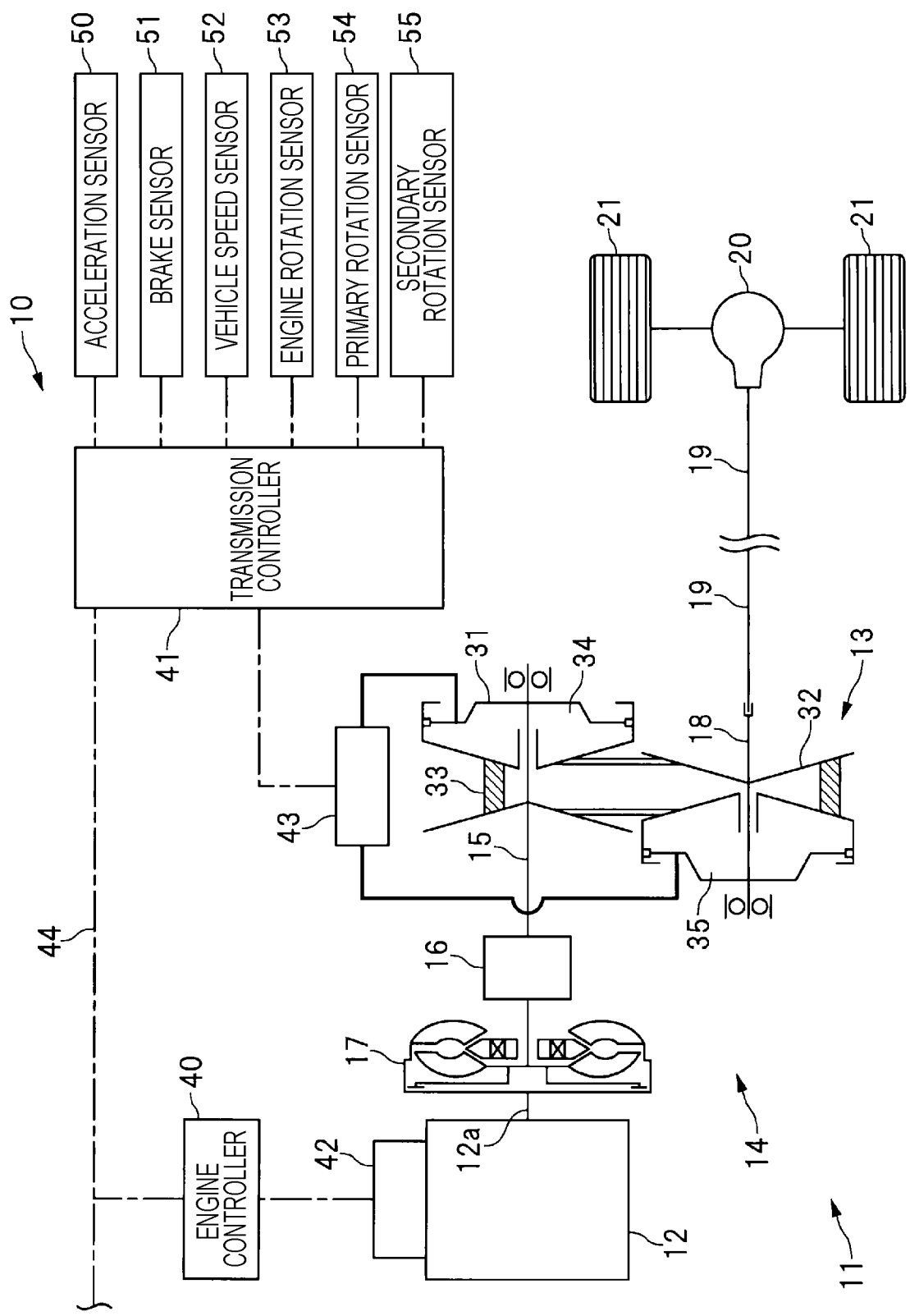
FIG. 1 schematically illustrates a vehicle equipped with a shift control device according to an embodiment of the disclosure.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

When a stepless shift mode is to be executed, various target transmission gear ratios are set in accordance with the running conditions. When a stepped shift mode is to be executed, a target transmission gear ratio is selected from a plurality of fixed transmission gear ratios. Accordingly, even when the running condition is the same, the target transmission gear ratio varies between the stepless shift mode and the stepped shift mode. Thus, when the shift mode is to be switched from the stepless shift mode to the stepped shift mode, it is conceivable that the stepped shift mode is commenced from a target transmission gear ratio that may be not possible in the stepped shift mode. Therefore, depending on the setting condition for a target transmission gear ratio in the stepless shift mode, it is difficult to appropriately execute the stepped shift mode after the shift mode is switched from the stepless shift mode to the stepped shift mode.

It is desirable to appropriately execute the stepped shift mode.

[Vehicle Structure]

FIG. 1 schematically illustrates a vehicle 11 equipped with a shift control device 10 according to an embodiment of the disclosure. As illustrated in FIG. 1, the vehicle 11 is equipped with a power train 14 provided with an engine 12 and a continuously variable transmission 13. A primary shaft 15 as an input shaft of the continuously variable transmission 13 is coupled to the engine 12 via an advance-retract switching mechanism 16 and a torque converter 17. A secondary shaft 18 as an output shaft of the continuously variable transmission 13 is coupled to wheels 21 via, for example, a driving-wheel output shaft 19 and a differential mechanism 20. The advance-retract switching mechanism 16 for switching the rotational direction of the primary shaft 15 includes, for example, a clutch and a planetary pinion train (not illustrated).

The continuously variable transmission 13 has a primary pulley 31 provided on the primary shaft 15, a secondary pulley 32 provided on the secondary shaft 18, and a driving chain 33 wound around these pulleys 31 and 32. The primary pulley 31 is provided with a primary chamber 34, and the secondary pulley 32 is provided with a secondary chamber 35. By controlling the oil pressure supplied to the primary chamber 34 and the secondary chamber 35, the groove widths of the primary pulley 31 and the secondary pulley 32 can be adjusted. Accordingly, the diameter of the driving chain 33 wound around the pulleys 31 and 32 can be changed, so that the transmission gear ratio of the continuously variable transmission 13 can be controlled.

[Control System]

A control system of the power train 14 will now be described. As illustrated in FIG. 1, the vehicle 11 is provided with an engine controller 40 and a transmission controller 41 that are constituted of, for example, microcomputers. The engine controller 40 outputs a control signal to an engine auxiliary unit 42, such as an injector, an igniter, and a throttle valve, to control the running mode of the engine 12. The transmission controller 41 outputs a control signal to a valve unit 43, constituted of a plurality of electromagnetic valves and oil passages, to control the operational modes of, for example, the continuously variable transmission 13, the advance-retract switching mechanism 16, and the torque converter 17. Hydraulic oil discharged from an oil pump (not illustrated) is pressure-controlled via the valve unit 43 and is subsequently supplied to oil chambers included in, for example, the continuously variable transmission 13 and the torque converter 17.

These controllers 40 and 41 are coupled to each other in a communicable manner via an in-vehicle network 44, such as either one of a controller area network (CAN) and a local interconnect network (LIN). The transmission controller 41 is coupled to an acceleration sensor 50 that detects an accelerator-pedal operated amount (referred to as "accelerator opening AP" hereinafter), a brake sensor 51 that detects a brake-pedal operated amount, and a vehicle speed sensor 52 that detects a vehicle speed VSP indicating the traveling speed of the vehicle 11. Furthermore, the transmission controller 41 is coupled to, for example, an engine rotation sensor 53 that detects an engine rotation speed Ne as a rotation speed of a crankshaft 12a, a primary rotation sensor 54 that detects a primary rotation speed as a rotation speed of the primary pulley 31, and a secondary rotation sensor 55 that detects a secondary rotation speed as a rotation speed of the secondary pulley 32.

[Shift Control of Continuously Variable Transmission]

Figure 2:
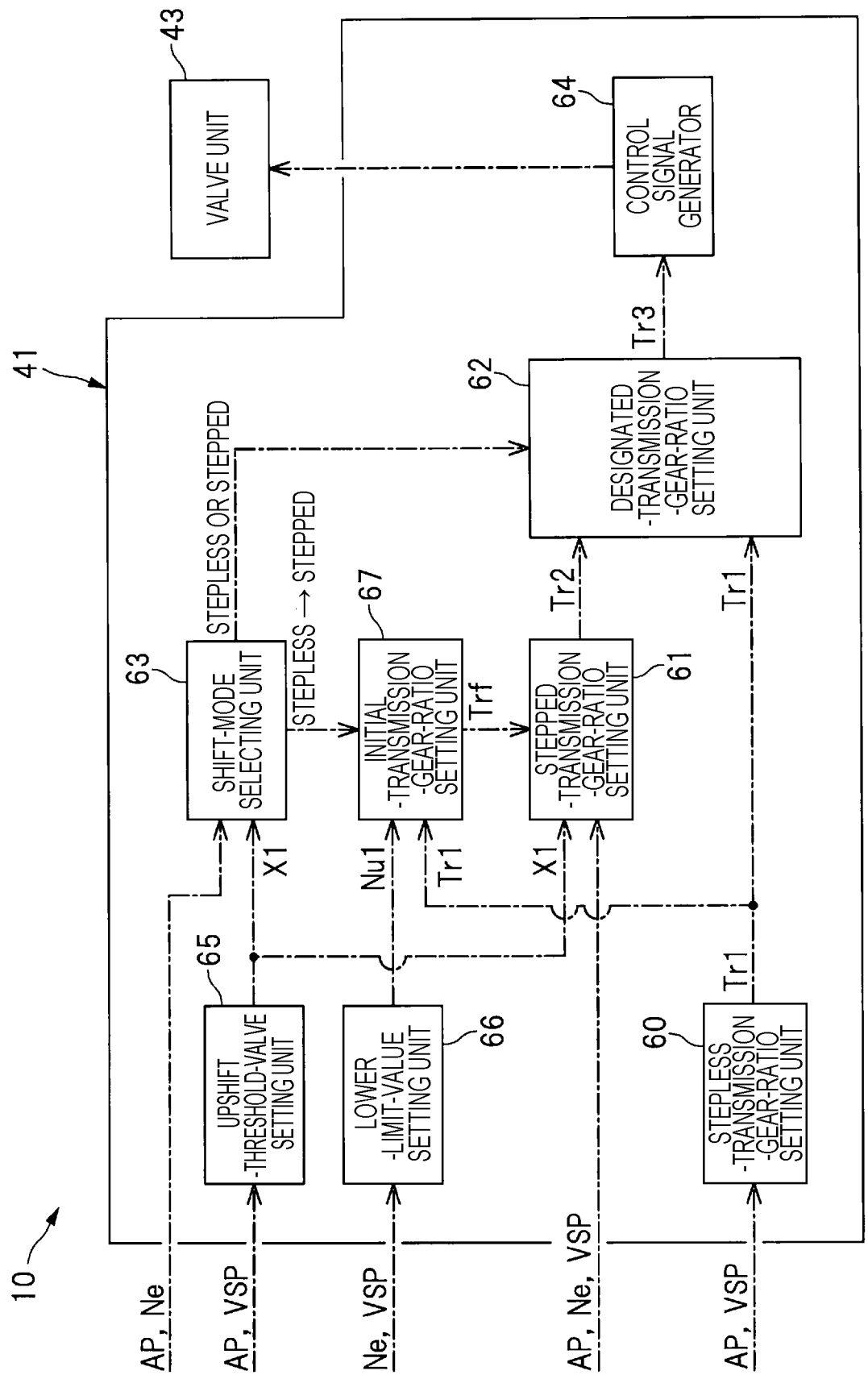
FIG. 2 is a block diagram illustrating a configuration example of a transmission controller.
Figure 3:
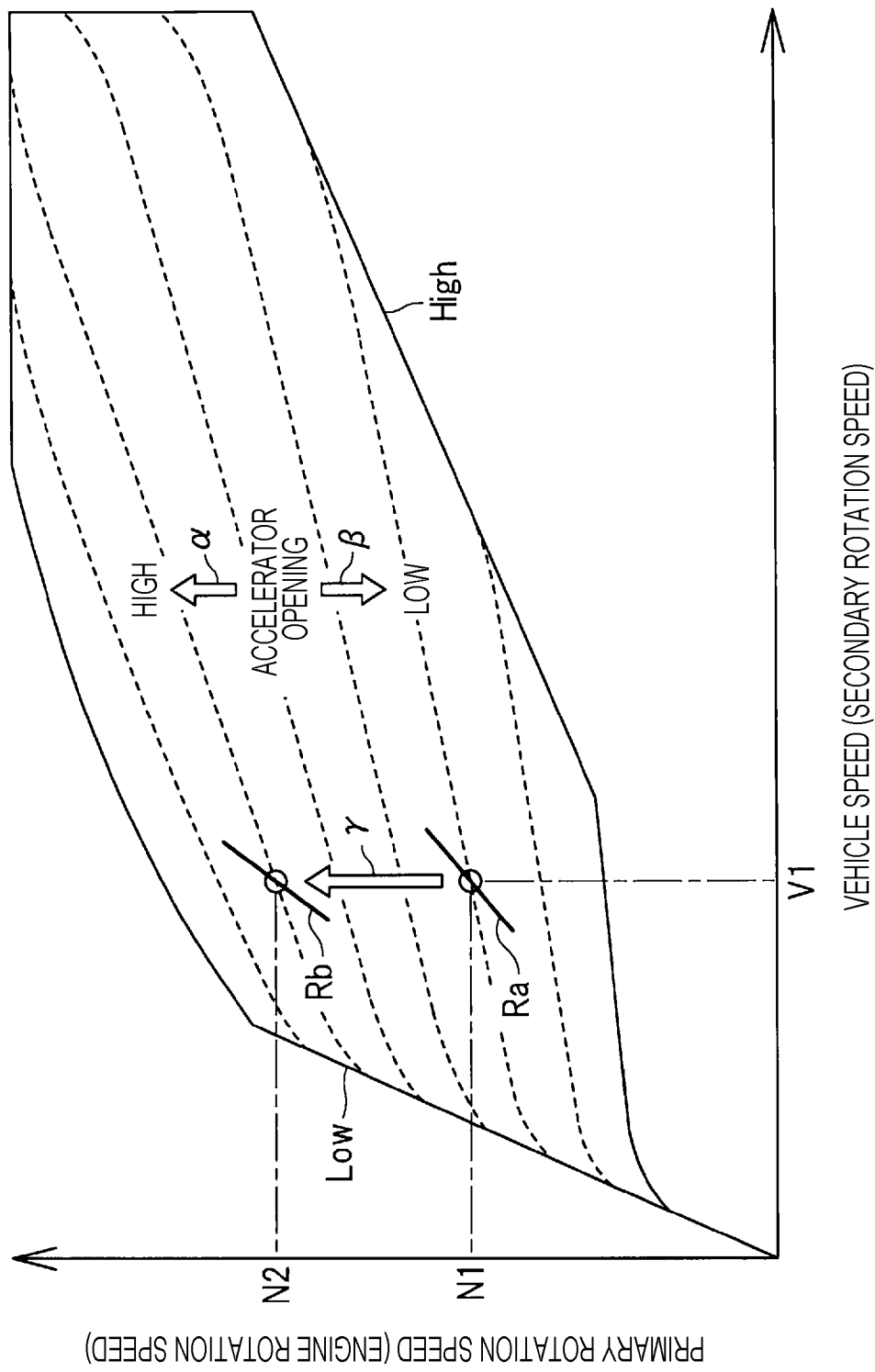
FIG. 3 illustrates an example of a shift situation when a stepless shift mode is used.
Figure 4:
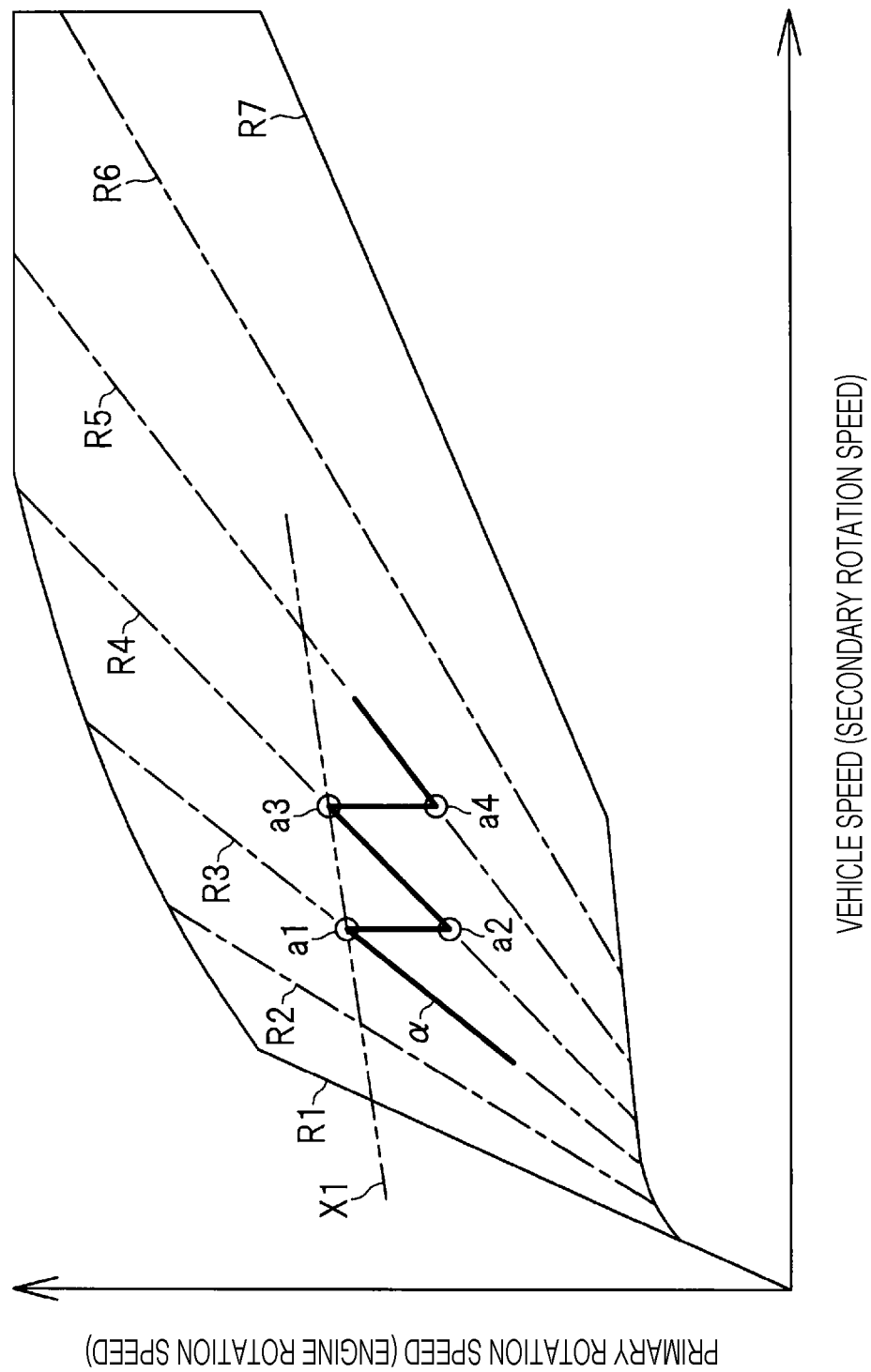
FIG. 4 illustrates an example of a shift situation when a stepped shift mode is used.

Shift control of the continuously variable transmission 13 will now be described. FIG. 2 is a block diagram illustrating a configuration example of the transmission controller 41. FIG. 3 illustrates an example of a shift situation when the stepless shift mode is used. FIG. 4 illustrates an example of a shift situation when the stepped shift mode is used.

As shift modes of the continuously variable transmission 13, the shift control device 10 has a stepless shift mode in which the transmission gear ratio is controlled in a stepless fashion and a stepped shift mode in which the transmission gear ratio is controlled in a stepwise fashion from a plurality of fixed transmission gear ratios. Thus, as illustrated in FIG. 2, the transmission controller 41 has a stepless-transmission-gear-ratio setting unit 60 that sets a target transmission gear ratio Tr1 to be used in the stepless shift mode and a stepped-transmission-gear-ratio setting unit 61 that sets a target transmission gear ratio Tr2 to be used in the stepped shift mode.

The stepless-transmission-gear-ratio setting unit 60 refers to a shift characteristic map based on the accelerator opening AP and the vehicle speed VSP and sets the target transmission gear ratio Tr1 to be used in the stepless shift mode. As illustrated in FIG. 3, a characteristic line Low indicating a lower-side maximum transmission gear ratio and a characteristic line High indicating a higher-side minimum transmission gear ratio are set in the shift characteristic map. Furthermore, as indicated by dashed lines, a plurality of characteristic lines corresponding to the accelerator opening AP as the operated amount of the accelerator pedal are set in the shift characteristic map. As the accelerator opening AP increases, that is, as the requested driving force with respect to the vehicle 11 increases, a characteristic line in the direction of an arrow α is selected. On the other hand, as the accelerator opening AP decreases, that is, as the requested driving force with respect to the vehicle 11 decreases, a characteristic line in the direction of an arrow β is selected. For example, as indicated by an arrow γ, if the accelerator pedal is pressed while the vehicle 11 is traveling at a vehicle speed V1, the target primary rotation speed is increased from N1 to N2 as a result of selection of a new characteristic line, and the target transmission gear ratio Tr1 is continuously controlled from "Ra" to "Rb" at the lower side. Accordingly, in the stepless shift mode, the target transmission gear ratio Tr1 is updated while changing in a continuous fashion, that is, in a stepless fashion.

The stepped-transmission-gear-ratio setting unit 61 refers to the shift characteristic map (not illustrated) based on the accelerator opening AP and the vehicle speed VSP and sets the target transmission gear ratio Tr2 to be used in the stepped shift mode. As illustrated in FIG. 4, for example, seven fixed transmission gear ratios R1 to R7 are each set in advance as the target transmission gear ratio Tr2 in the stepped shift mode. As indicated by a thick line α in FIG. 4, when the engine rotation speed Ne reaches a predetermined upshift threshold X1 (reference sign a1), to be described later, during acceleration using the third fixed transmission gear ratio R3, the target transmission gear ratio Tr2 is switched to the fourth fixed transmission gear ratio R4 (reference sign a2). Subsequently, when the engine rotation speed Ne reaches the upshift threshold X1 (reference sign a3) during acceleration using the fourth fixed transmission gear ratio R4, the target transmission gear ratio Tr2 is switched to the fifth fixed transmission gear ratio R5 (reference sign a4). Accordingly, in the stepped shift mode, the target transmission gear ratio Tr2 is selected from the fixed transmission gear ratios R1 to R7, such that the target transmission gear ratio Tr2 is switched in a stepwise fashion.

As illustrated in FIG. 2, the transmission controller 41 has a designated-transmission-gear-ratio setting unit 62 that sets a designated transmission gear ratio Tr3 and a shift-mode selecting unit (mode setting unit) 63 that selects either one of the stepless shift mode and the stepped shift mode as the shift mode. As will be described later, the shift-mode selecting unit 63 selects the shift mode (i.e., either one of the stepless shift mode and the stepped shift mode) based on, for example, the accelerator opening AP, and outputs the selected shift mode to the designated-transmission-gear-ratio setting unit 62. The designated-transmission-gear-ratio setting unit 62 sets the designated transmission gear ratio Tr3 as the ultimate control target based on the selection result of the shift mode. In one example, when the stepless shift mode is selected as the shift mode, the designated-transmission-gear-ratio setting unit 62 sets the target transmission gear ratio Tr1 from the stepless-transmission-gear-ratio setting unit 60 as the designated transmission gear ratio Tr3. On the other hand, when the stepped shift mode is selected as the shift mode, the designated-transmission-gear-ratio setting unit 62 sets the target transmission gear ratio Tr2 from the stepped-transmission-gear-ratio setting unit 61 as the designated transmission gear ratio Tr3.

Then, a control signal generator 64 coupled to the designated-transmission-gear-ratio setting unit 62 generates a control signal based on the designated transmission gear ratio Tr3 and outputs this control signal to the valve unit 43. The valve unit 43 adjusts the pressure of hydraulic oil supplied to the primary chamber 34 and the secondary chamber 35, and controls the transmission gear ratio of the continuously variable transmission 13 toward the designated transmission gear ratio Tr3. Accordingly, the stepless-transmission-gear-ratio setting unit 60, the designated-transmission-gear-ratio setting unit 62, and the control signal generator 64 constitute a stepless shift controller that executes the stepless shift mode. Furthermore, the stepped-transmission-gear-ratio setting unit 61, the designated-transmission-gear-ratio setting unit 62, and the control signal generator 64 constitute a stepped shift controller that executes the stepped shift mode.

[Shift-Mode Switching Control]

Figure 5:
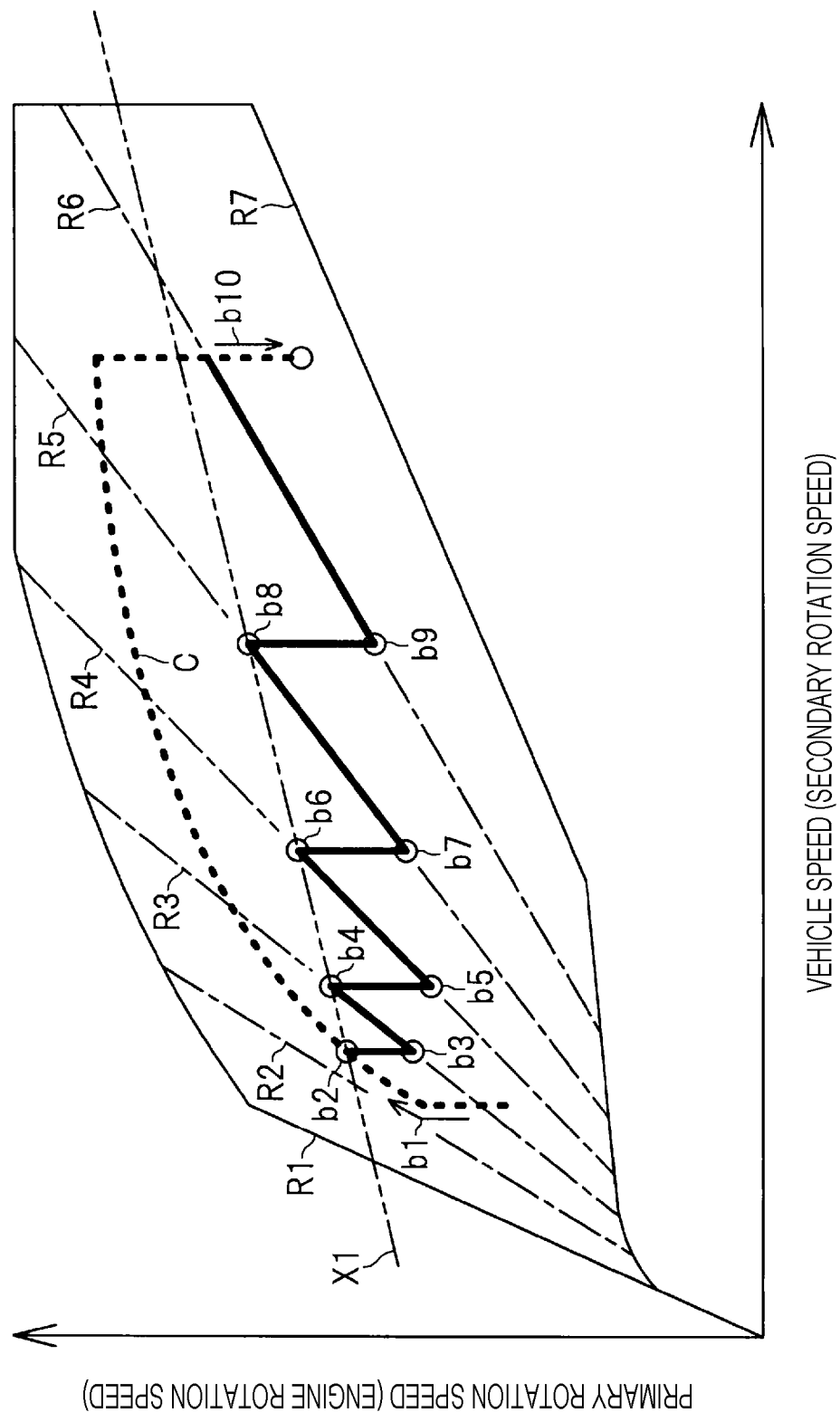
FIG. 5 illustrates an example of a shift situation involving switching of shift modes.
Figure 6:
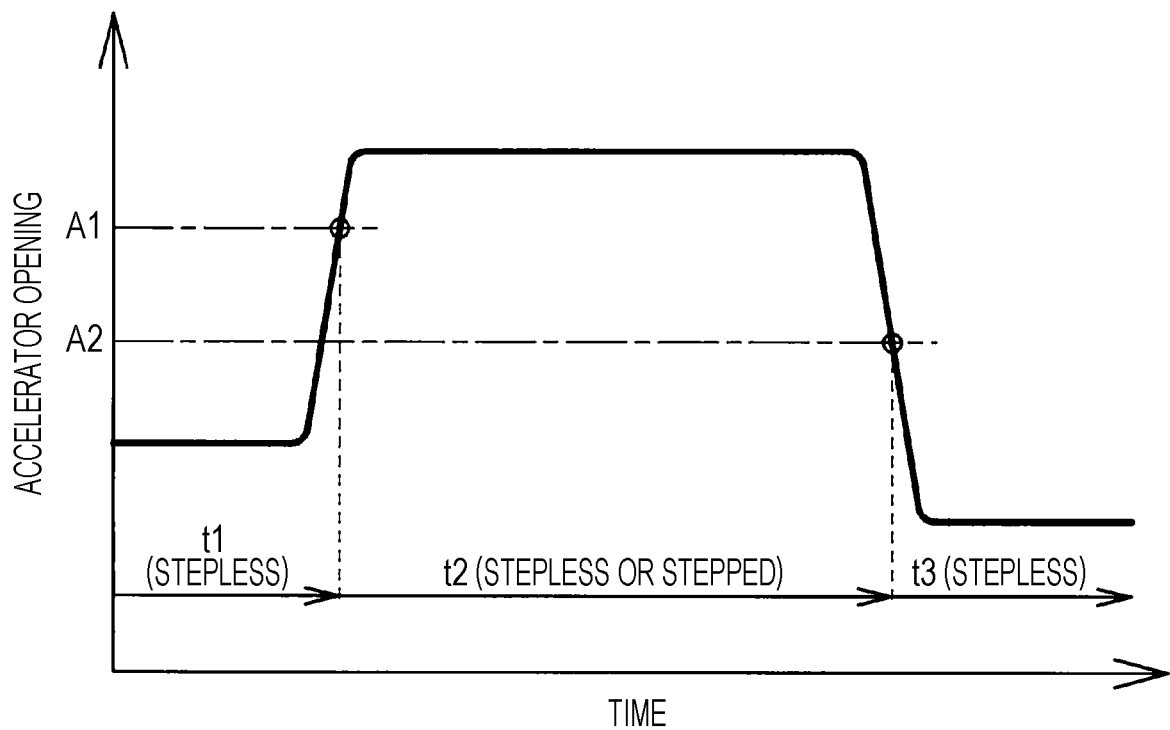
FIG. 6 illustrates an example where an accelerator pedal is operated in correspondence with the shift situation illustrated in FIG. 5.
Figure 7:
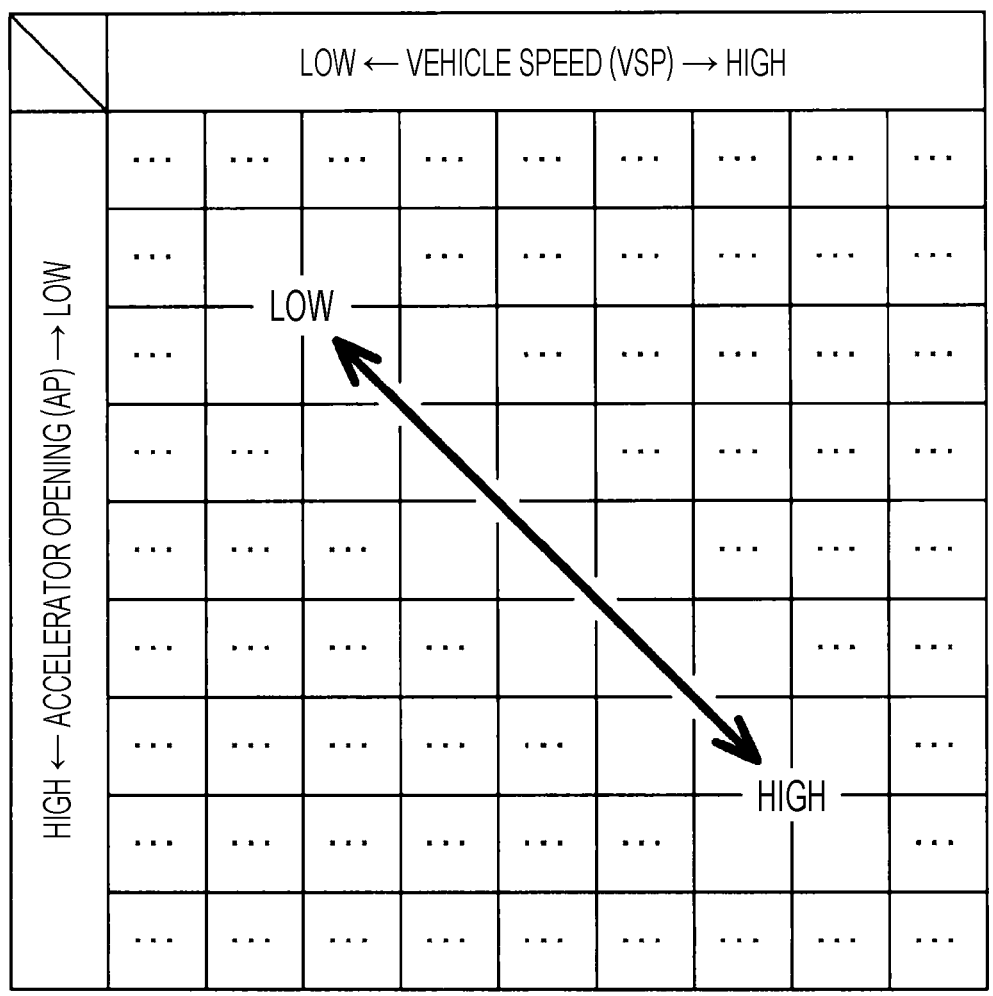
FIG. 7 illustrates an example of an upshift threshold used in the stepped shift mode.

The following description relates to switching of the shift mode from the stepless shift mode to the stepped shift mode. FIG. 5 illustrates an example of a shift situation involving switching of shift modes. In FIG. 5, the shift situation according to the stepless shift mode is indicated by a dashed line, and the shift situation according to the stepped shift mode is indicated by a solid line. FIG. 6 illustrates an example where the accelerator pedal is operated in the shift situation illustrated in FIG. 5. FIG. 7 illustrates an example of the upshift threshold X1 used in the stepped shift mode.

As illustrated in FIG. 2, the transmission controller 41 has an upshift-threshold setting unit 65 that sets the upshift threshold X1. As described above, the shift-mode selecting unit 63 switches the shift mode between the stepless shift mode and the stepped shift mode based on, for example, the accelerator opening AP. The shift mode is switched from the stepless shift mode to the stepped shift mode when a condition in which the accelerator opening AP exceeds a predetermined opening threshold (operation threshold) A1 and the engine rotation speed Ne exceeds a predetermined upshift threshold (rotation threshold) X1 is satisfied. In one example, when the vehicle 11 is to be accelerated in response to an operation performed on the accelerator pedal, the shift mode is switched from the stepless shift mode to the stepped shift mode. The shift mode is switched from the stepped shift mode to the stepless shift mode when a condition in which the accelerator opening AP falls below the opening threshold A2 that is lower than the opening threshold A1 is satisfied.

In one example, as indicated by a reference sign t1 in FIG. 6, the stepless shift mode is selected as the shift mode until the accelerator opening AP reaches the opening threshold A1. Furthermore, as indicated by a reference sign t2, until the accelerator opening AP falls below the opening threshold A2 from when the accelerator opening AP exceeds the opening threshold A1, if the engine rotation speed Ne reaches the upshift threshold X1, as will be described later, the shift mode is switched from the stepless shift mode to the stepped shift mode. Moreover, as indicated by a reference sign t3, when the accelerator opening AP falls below the opening threshold A2, the stepless shift mode is selected as the shift mode.

As indicated by an arrow b1 in FIG. 5, when the accelerator pedal is pressed in the stepless shift mode, the target transmission gear ratio Tr1 changes toward the lower side and the engine rotation speed Ne is gradually increased. In this case, the accelerator pedal is pressed by the vehicle occupant and the accelerator opening AP exceeds the opening threshold A1. Subsequently, when the engine rotation speed Ne reaches the predetermined upshift threshold X1 (reference sign b2), the condition for switching the shift mode to the stepped shift mode is satisfied, so that the shift mode is switched from the stepless shift mode to the stepped shift mode and the continuously variable transmission 13 is upshifted to the third fixed transmission gear ratio R3 (reference sign b3). In subsequent acceleration, every time the engine rotation speed Ne reaches the upshift threshold X1 (reference signs b4, b6, and b8), the continuously variable transmission 13 is upshifted to the higher fixed transmission gear ratios R4 to R6 (reference signs b5, b7, and b9). Then, when the accelerator pedal is released from the pressed state, the condition for switching the shift mode to the stepless shift mode is satisfied, so that the shift mode is switched from the stepped shift mode to the stepless shift mode, as indicated by an arrow b10, whereby the stepless transmission gear ratio is controlled toward the higher side and the engine rotation speed Ne is gradually decreased.

The upshift threshold X1 illustrated in FIG. 5 is set based on the accelerator opening AP and the vehicle speed VSP. As illustrated in FIG. 7, the upshift threshold X1 is set to a lower value as the accelerator opening AP decreases, whereas the upshift threshold X1 is set to a higher value as the accelerator opening AP increases. Furthermore, the upshift threshold X1 is set to a lower value as the vehicle speed VSP decreases, whereas the upshift threshold X1 is set to a higher value as the vehicle speed VSP increases. By setting the upshift threshold X1 in this manner, upshifting can be suppressed in regions where the accelerator opening AP and the vehicle speed VSP are high, so that the driving force when the vehicle 11 is accelerated in the stepped shift mode can be ensured.

As described above, when the accelerator pedal is deeply pressed during traveling in the stepless shift mode, the shift mode is switched from the stepless shift mode to the stepped shift mode. Accordingly, when the vehicle 11 is to be accelerated, the manners in which the engine rotation speed and the vehicle speed are increased can be made proportional to each other, so that the vehicle 11 can be accelerated without giving a sense of discomfort to the vehicle occupant or occupants. Furthermore, as indicated by a dashed line C in FIG. 5, if the vehicle 11 is accelerated while the stepless shift mode is maintained, the engine rotation speed tends to remain high. However, by switching the shift mode from the stepless shift mode to the stepped shift mode, the vehicle 11 can be accelerated while decreasing the engine rotation speed. By decreasing the engine rotation speed in this manner, noise and loss of the power train 14 can be reduced.

[Initial Transmission Gear Ratio in Stepped Shift Mode: First Embodiment]

As described above, if the accelerator pedal is pressed deeply in the stepless shift mode, the shift mode is switched from the stepless shift mode to the stepped shift mode by performing upshifting to any one of the fixed transmission gear ratios R2 to R7. In this case, from the standpoint of appropriately executing the stepped shift mode, a lower limit value is set for a variation in the engine rotation speed (referred to as "rotation-speed variation" hereinafter) in the shift-mode switching process. In one example, although the engine rotation speed decreases in accordance with upshifting when the shift mode is switched from the stepless shift mode to the stepped shift mode, a lower limit value is set for this variation in the engine rotation speed. Then, in order to ensure a rotation-speed variation that is greater than or equal to the lower limit value, the transmission controller 41 sets an initial transmission gear ratio as a target upshift transmission gear ratio in the stepped shift mode. An initial transmission gear ratio in the stepped shift mode is a target transmission gear ratio that is set first in the stepped shift mode when the shift mode is to be switched from the stepless shift mode to the stepped shift mode.

Figure 8:
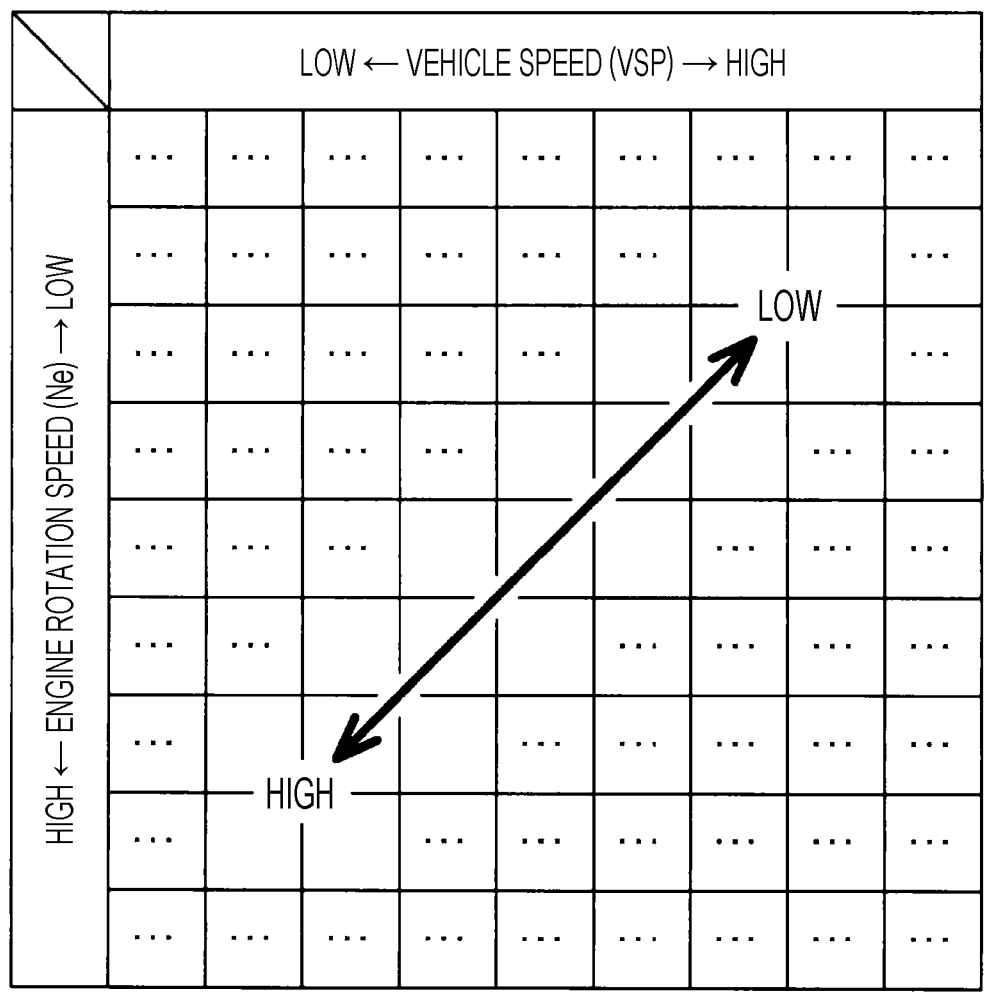
FIG. 8 illustrates an example of a lower limit value for a rotation-speed variation.

As illustrated in FIG. 2, the transmission controller 41 has a lower-limit-value setting unit 66 that sets a lower limit value Nu1 for setting an initial transmission gear ratio, and also has an initial-transmission-gear-ratio setting unit 67 that sets an initial transmission gear ratio Trf in the stepped shift mode. The lower-limit-value setting unit 66 sets the lower limit value Nu1 for the rotation-speed variation based on the engine rotation speed Ne and the vehicle speed VSP. FIG. 8 illustrates an example of the lower limit value Nu1 for the rotation-speed variation. As illustrated in FIG. 8, the lower limit value Nu1 is set to a lower value as the engine rotation speed Ne decreases, whereas the lower limit value Nu1 is set to a higher value as the engine rotation speed Ne increases. Furthermore, the lower limit value Nu1 is set to a higher value as the vehicle speed VSP decreases, whereas the lower limit value Nu1 is set to a lower value as the vehicle speed VSP increases.

Next, as illustrated in FIG. 2, the initial-transmission-gear-ratio setting unit 67 sets the initial transmission gear ratio Trf as a target upshift transmission gear ratio in the stepped shift mode based on the target transmission gear ratio Tr1 from the stepless-transmission-gear-ratio setting unit 60 and the lower limit value Nu1 from the lower-limit-value setting unit 66. In one example, when the shift mode is to be switched from the stepless shift mode to the stepped shift mode in accordance with upshifting, the initial-transmission-gear-ratio setting unit 67 sets the initial transmission gear ratio Trf as a target upshift transmission gear ratio from the fixed transmission gear ratios R2 to R7, so that a rotation-speed variation greater than or equal to the lower limit value Nu1 is obtained.

Figure 9:
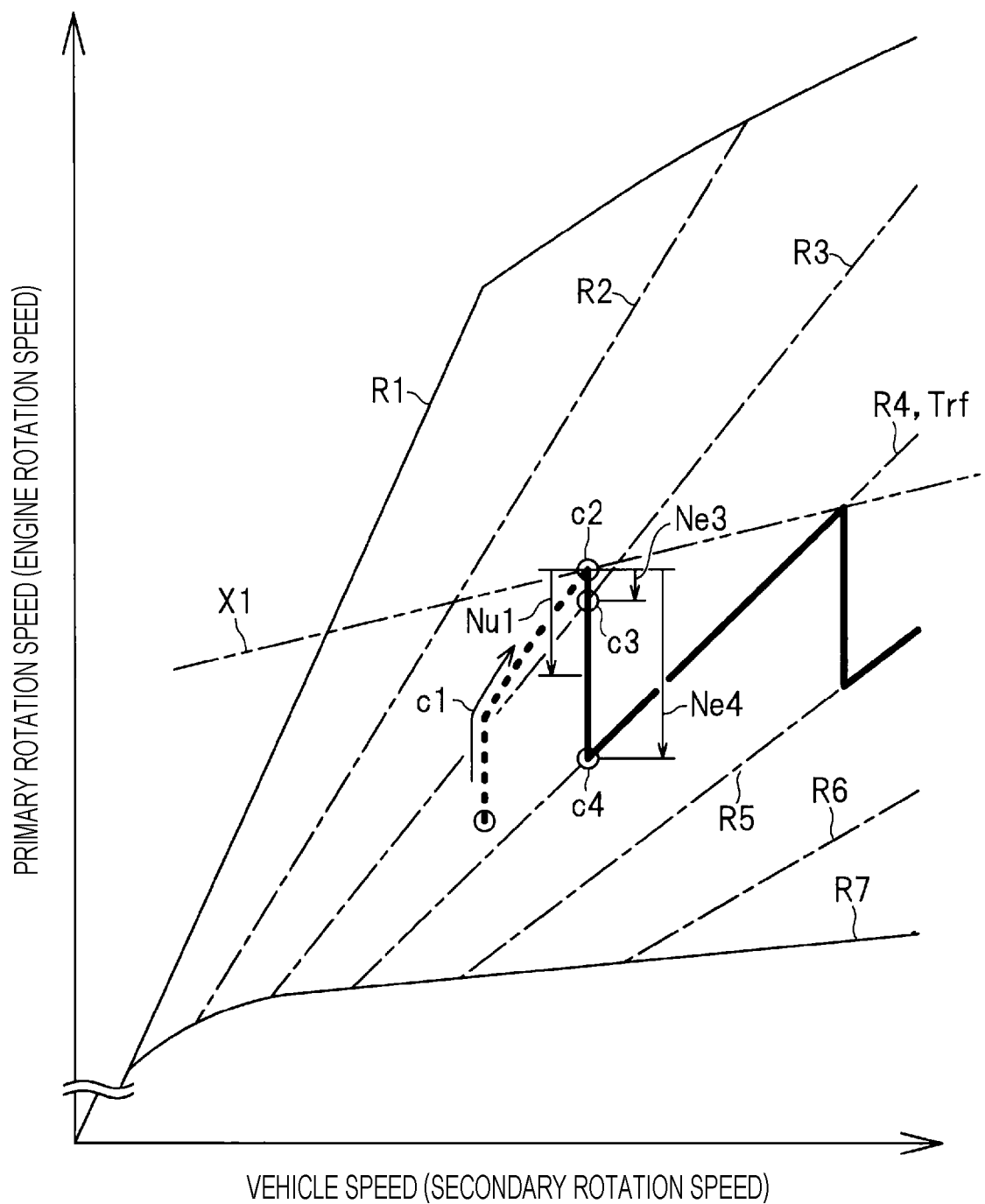
FIG. 9 illustrates an example of a shift situation when the shift mode is switched from the stepless shift mode to the stepped shift mode.

FIG. 9 illustrates an example of a shift situation when the shift mode is switched from the stepless shift mode to the stepped shift mode. In FIG. 9, the shift situation according to the stepless shift mode is indicated by a dashed line, and the shift situation according to the stepped shift mode is indicated by a solid line. A process performed by the initial-transmission-gear-ratio setting unit 67 for setting the initial transmission gear ratio Trf will be described below with reference to FIG. 9.

As indicated by an arrow c1 in FIG. 9, when the accelerator pedal is pressed in the stepless shift mode, the target transmission gear ratio is controlled toward the lower side, and the engine rotation speed Ne is gradually increased. The situation indicated by the arrow c1 is a situation where the accelerator pedal is pressed by the vehicle occupant and the accelerator opening AP exceeds the opening threshold A1. When such acceleration continues and the engine rotation speed Ne reaches the predetermined upshift threshold X1 (reference sign c2), the shift mode is switched from the stepless shift mode to the stepped shift mode since the condition for switching the shift mode to the stepped shift mode is satisfied. In this case, the fourth fixed transmission gear ratio R4 is set (reference sign c4) as the initial transmission gear ratio Trf in the stepped shift mode instead of the third fixed transmission gear ratio R3 (reference sign c3), so that the rotation-speed variation becomes greater than or equal to the lower limit value Nu1.

In one example, the initial-transmission-gear-ratio setting unit 67 selects the third fixed transmission gear ratio R3 as an upshift candidate that is close to the current transmission gear ratio. Subsequently, the initial-transmission-gear-ratio setting unit 67 estimates a rotation-speed variation Ne3 when the transmission gear ratio is controlled to the fixed transmission gear ratio R3, and compares the rotation-speed variation Ne3 with the lower limit value Nu1. In the example illustrated in FIG. 9, since the rotation-speed variation Ne3 is smaller than the lower limit value Nu1, the initial-transmission-gear-ratio setting unit 67 selects the fourth fixed transmission gear ratio R4 as a new upshift candidate. Then, the initial-transmission-gear-ratio setting unit 67 estimates a rotation-speed variation Ne4 when the transmission gear ratio is controlled to the fourth fixed transmission gear ratio R4, and compares the rotation-speed variation Ne4 with the lower limit value Nu1. In the example illustrated in FIG. 9, since the rotation-speed variation Ne4 is greater than or equal to the lower limit value Nu1, the initial-transmission-gear-ratio setting unit 67 sets the fourth fixed transmission gear ratio R4 as the initial transmission gear ratio Trf.

Figure 10:
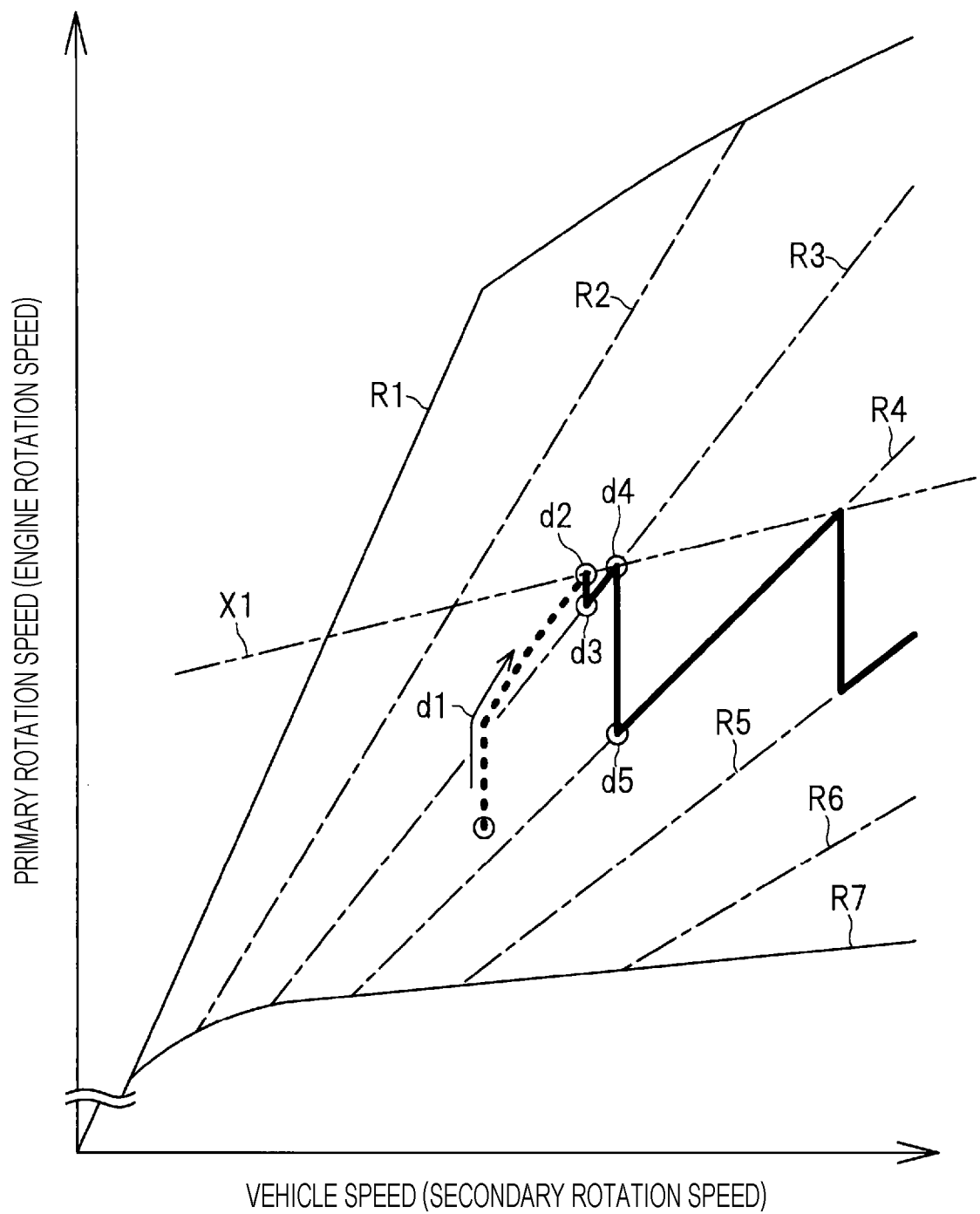
FIG. 10 illustrates an example of a shift situation when the shift mode is switched from the stepless shift mode to the stepped shift mode, in accordance with a comparative example.

FIG. 10 illustrates a shift situation when the shift mode is switched from the stepless shift mode to the stepped shift mode, in accordance with a comparative example. As indicated by an arrow d1 in FIG. 10, when the accelerator pedal is pressed in the stepless shift mode, the target transmission gear ratio is controlled toward the lower side, and the engine rotation speed Ne is gradually increased. The situation indicated by the arrow d1 is a situation where the accelerator pedal is pressed by the vehicle occupant and the accelerator opening AP exceeds the opening threshold A1. Subsequently, when the engine rotation speed Ne reaches the predetermined upshift threshold X1 (reference sign d2), the condition for switching the shift mode to the stepped shift mode is satisfied, so that the shift mode is switched from the stepless shift mode to the stepped shift mode and the continuously variable transmission 13 is upshifted to the third fixed transmission gear ratio R3 that is close to the current transmission gear ratio (reference sign d3). Then, when the engine rotation speed Ne reaches the upshift threshold X1 (reference sign d4), the continuously variable transmission 13 is continuously upshifted to the fixed transmission gear ratio R4 (reference sign d5).

In the comparative example illustrated in FIG. 10, upshifting is repeated at short intervals, as indicated by reference signs d2 to d5. The reason that upshifting is repeated at short intervals in this manner is that fine vertical fluctuations of the engine rotation speed Ne are repeated and give a sense of discomfort to the vehicle occupant and occupants. In contrast, as illustrated in FIG. 9, the shift control device 10 skips the fixed transmission gear ratio R3 and sets the fixed transmission gear ratio R4 as the initial transmission gear ratio Trf (reference signs c3 and c4), so that the rotation-speed variation becomes greater than or equal to the lower limit value Nu1. Accordingly, even when the shift mode is switched from the stepless shift mode to the stepped shift mode, frequent upshifting in the stepped shift mode can be prevented, whereby the stepped shift mode can be appropriately executed.

Furthermore, as illustrated in FIG. 8, the lower limit value Nu1 is set to a lower value as the engine rotation speed Ne decreases, whereas the lower limit value Nu1 is set to a higher value as the engine rotation speed Ne increases. Moreover, the lower limit value Nu1 is set to a higher value as the vehicle speed VSP decreases, whereas the lower limit value Nu1 is set to a lower value as the vehicle speed VSP increases. Accordingly, in a region where the engine rotation speed Ne is low and a region where the vehicle speed VSP is high, the lower limit value Nu1 is set to a low value. Thus, when the vehicle 11 is to be accelerated by transitioning to the stepped shift mode, the vehicle 11 can be appropriately accelerated without excessively decreasing the engine rotation speed Ne.

[Initial Transmission Gear Ratio in Stepped Shift Mode: Second Embodiment]

Figure 11:
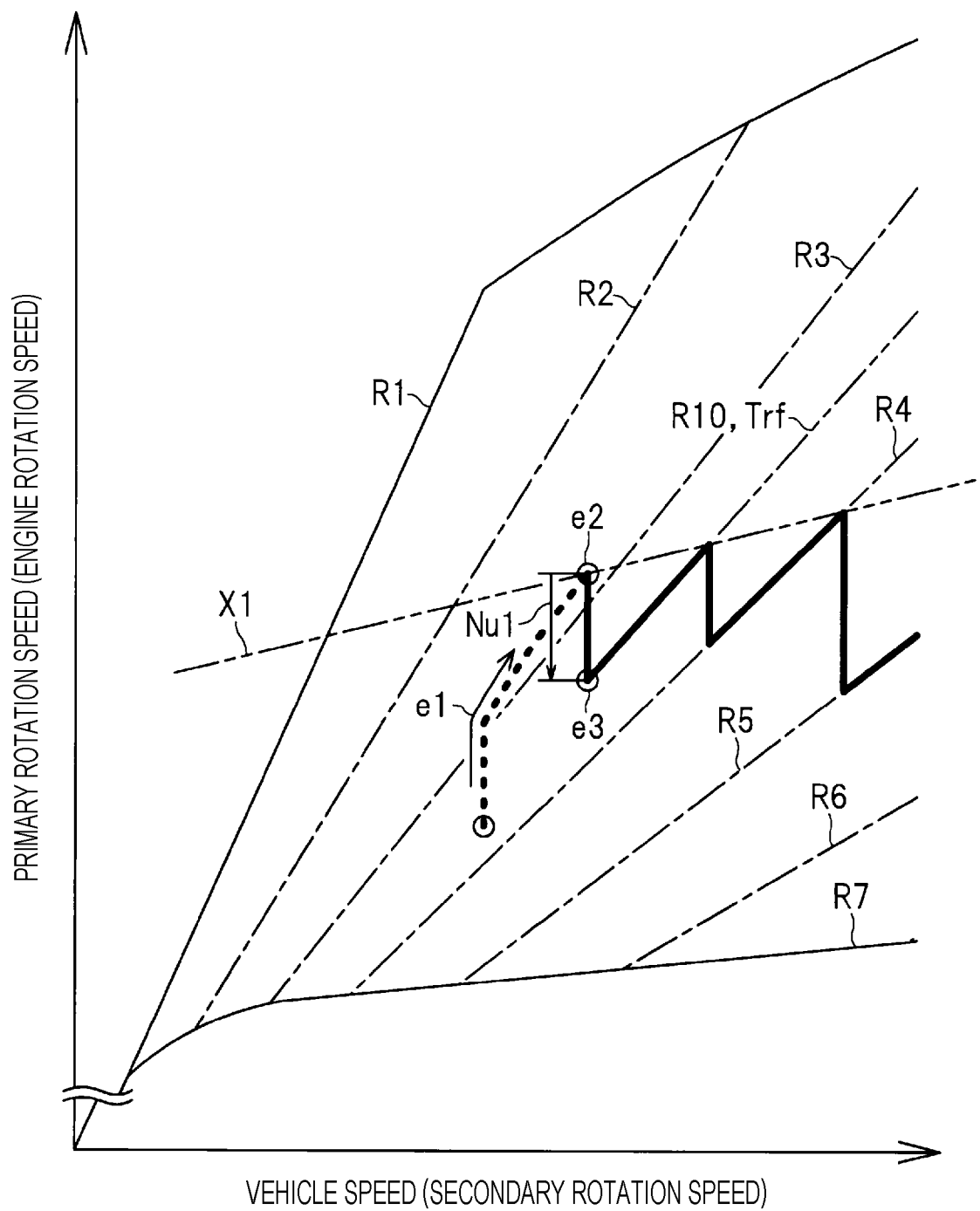
FIG. 11 illustrates another example of a shift situation when the shift mode is switched from the stepless shift mode to the stepped shift mode.

In the first embodiment illustrated in FIG. 9, the fixed transmission gear ratio R4, that is, a fixed transmission gear ratio set in advance for the stepped shift mode, is used as the initial transmission gear ratio Trf in the stepped shift mode. Alternatively, a fixed transmission gear ratio other than the fixed transmission gear ratios R2 to R7 may be set as the initial transmission gear ratio Trf as a target upshift transmission gear ratio. FIG. 11 illustrates another embodiment of a shift situation when the shift mode is switched from the stepless shift mode to the stepped shift mode. In FIG. 11, the shift situation according to the stepless shift mode is indicated by a dashed line, and the shift situation according to the stepped shift mode is indicated by a solid line.

As indicated by an arrow e1 in FIG. 11, when the accelerator pedal is pressed in the stepless shift mode, the target transmission gear ratio is controlled toward the lower side, and the engine rotation speed Ne is gradually increased. The situation indicated by the arrow e1 is a situation where the accelerator pedal is pressed by the vehicle occupant and the accelerator opening AP exceeds the opening threshold A1. When such acceleration continues and the engine rotation speed Ne reaches the predetermined upshift threshold X1 (reference sign e2), the shift mode is switched from the stepless shift mode to the stepped shift mode since the condition for switching the shift mode to the stepped shift mode is satisfied. In this case, the fixed transmission gear ratio R10 is set by calculation (reference sign e3) as the initial transmission gear ratio Trf in the stepped shift mode, so that the rotation-speed variation matches the lower limit value Nu1. Accordingly, even when the fixed transmission gear ratio R10 other than the fixed transmission gear ratios R2 to R7 is calculated and this fixed transmission gear ratio R10 is set as the initial transmission gear ratio Trf, frequent upshifting in the stepped shift mode can be prevented, whereby the stepped shift mode can be appropriately executed.

[Initial Transmission Gear Ratio in Stepped Shift Mode: Third Embodiment]

Figure 12:
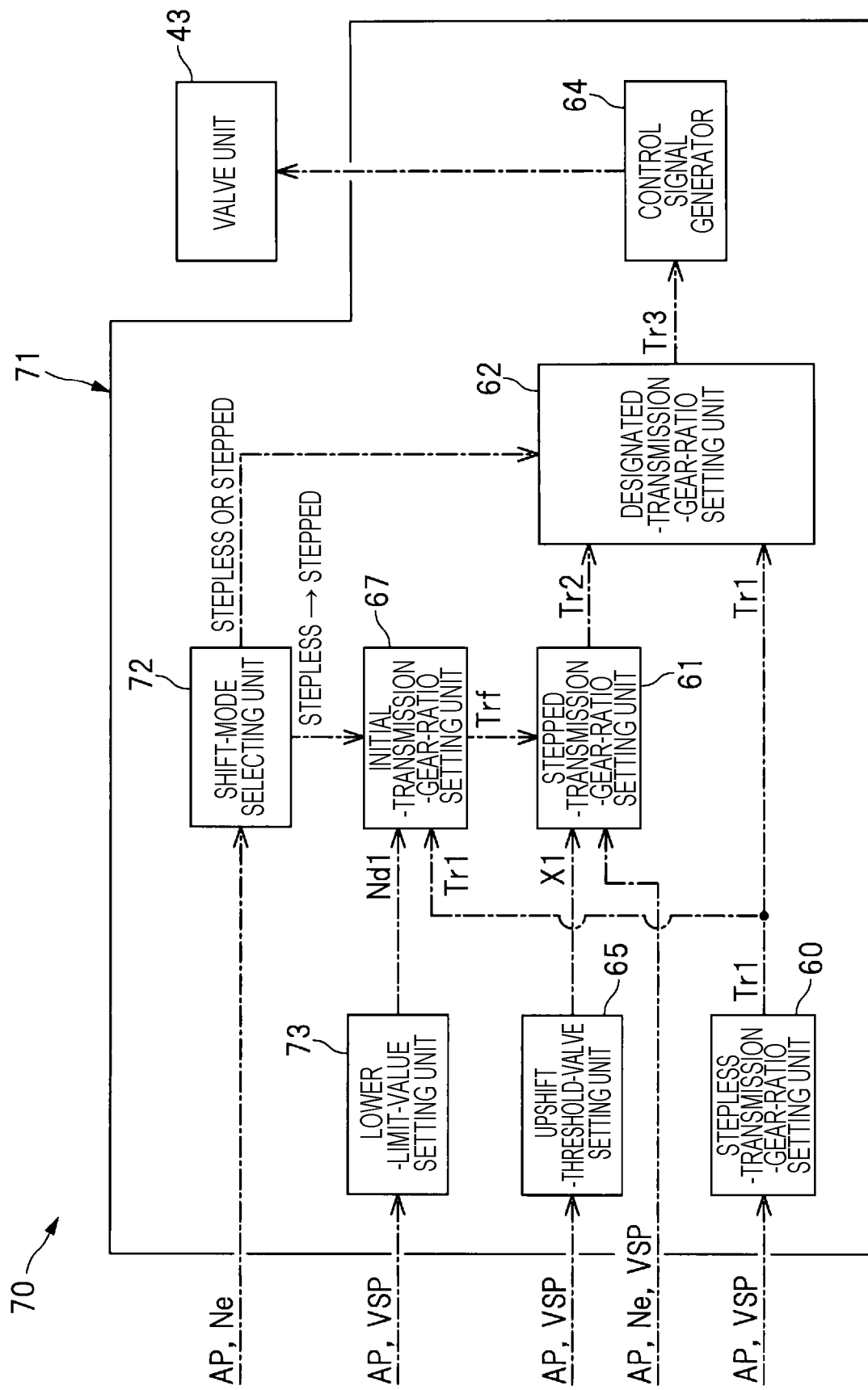
FIG. 12 is a block diagram illustrating a configuration example of a transmission controller included in a shift control device according to another embodiment of the disclosure.
Figure 13:
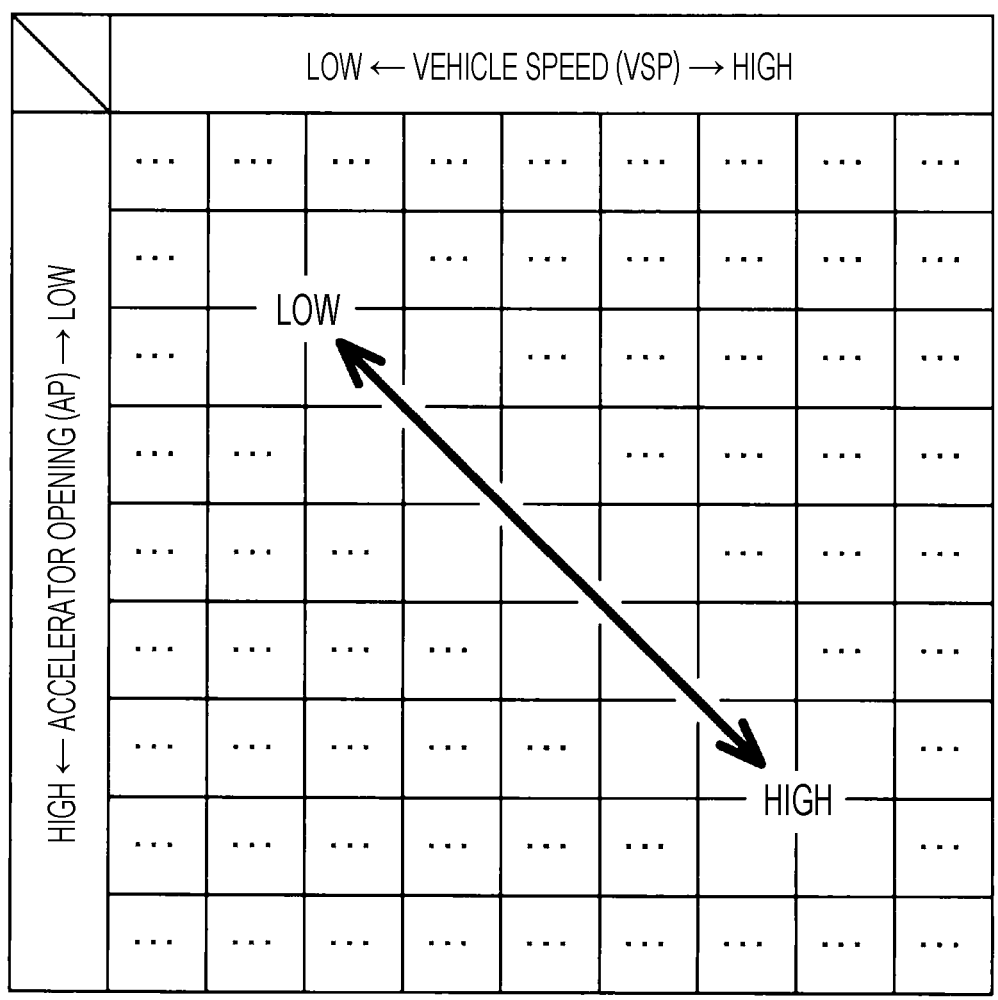
FIG. 13 illustrates an example of a lower limit value for a rotation-speed variation.
Figure 14:
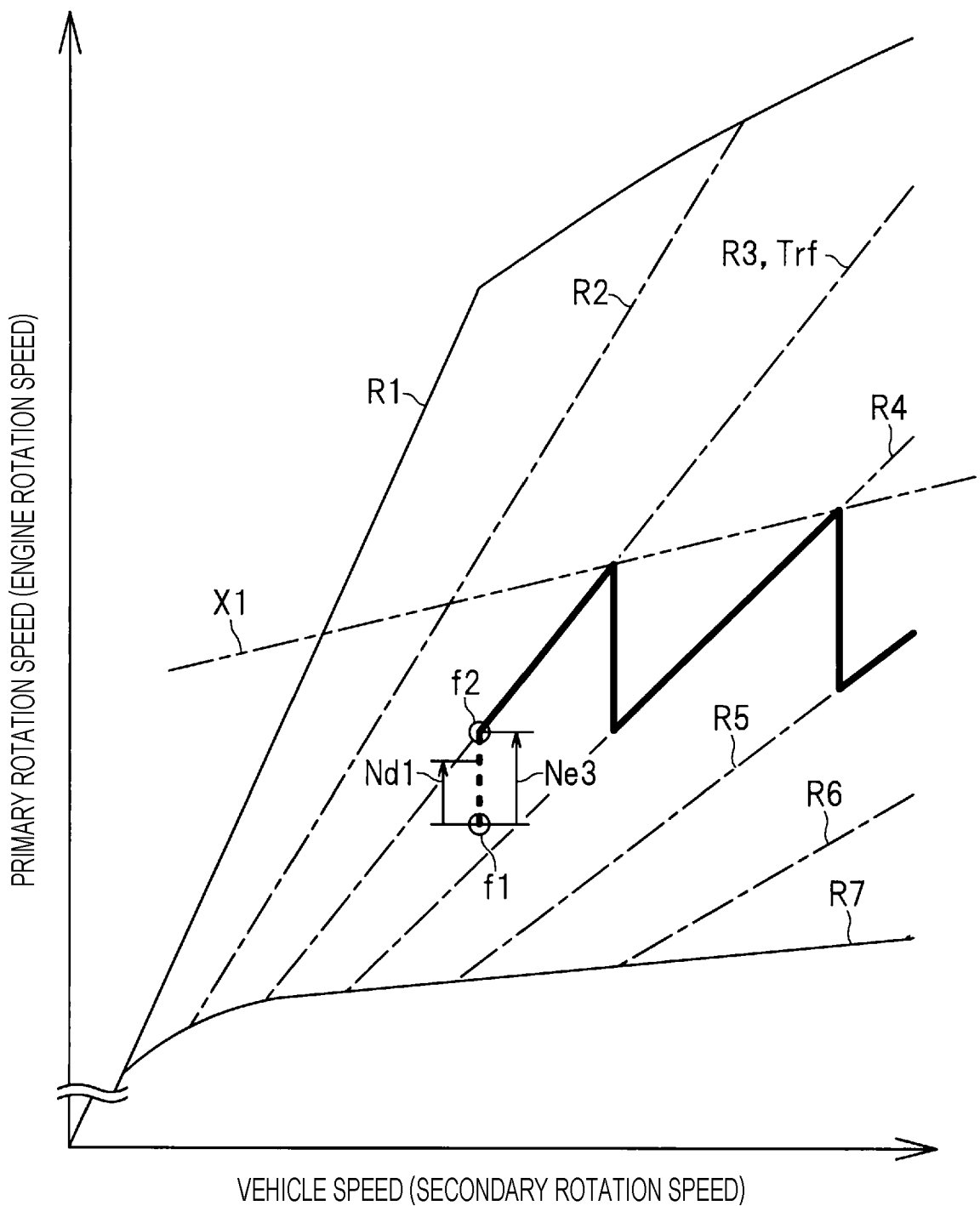
FIG. 14 illustrates another example of a shift situation when the shift mode is switched from the stepless shift mode to the stepped shift mode.

In the first and second embodiments illustrated in FIG. 9 and FIG. 11, the shift mode is switched from the stepped shift mode to the stepless shift mode in accordance with upshifting when the shift mode is switched from the stepped shift mode to the stepless shift mode. Alternatively, the shift mode may be switched from the stepped shift mode to the stepless shift mode in accordance with downshifting. FIG. 12 is a block diagram illustrating a configuration example of a transmission controller 71 included in a shift control device 70 according to another embodiment of the disclosure. In FIG. 12, for example, setting units similar to the setting units illustrated in FIG. 2 are given the same reference signs, and descriptions thereof are omitted. FIG. 13 illustrates an example of the lower limit value Nd1 for the rotation-speed variation. FIG. 14 illustrates another example of a shift situation when the shift mode is switched from the stepless shift mode to the stepped shift mode. In FIG. 14, the shift situation according to the stepless shift mode is indicated by a dashed line, and the shift situation according to the stepped shift mode is indicated by a solid line.

As described above, the shift-mode selecting unit 63 used in the first and second embodiments switches the shift mode from the stepless shift mode to the stepped shift mode when the accelerator opening AP exceeds the predetermined opening threshold (operation threshold) A1 and the engine rotation speed Ne exceeds the predetermined upshift threshold X1 during traveling in the stepless shift mode. In contrast, as illustrated in FIG. 12, a shift-mode selecting unit (mode setting unit) 72 used in a third embodiment and a fourth embodiment, to be described later, switches the shift mode from the stepless shift mode to the stepped shift mode if the accelerator opening AP exceeds the predetermined opening threshold (operation threshold) A1 during traveling in the stepless shift mode. In one example, in the third embodiment and the fourth embodiment, to be described later, when the vehicle 11 is to be accelerated from the stepless shift mode in response to an operation performed on the accelerator pedal, the shift mode is switched from the stepless shift mode to the stepped shift mode in accordance with downshifting without waiting for the engine rotation speed Ne to increase.

The lower-limit-value setting unit 66 used in the first and second embodiments sets the lower limit value Nu1 based on the engine rotation speed Ne and the vehicle speed VSP. In contrast, a lower-limit-value setting unit 73 used in the third embodiment and the fourth embodiment, to be described later, sets the lower limit value Nd1 based on the accelerator opening AP and the vehicle speed VSP. In one example, as illustrated in FIG. 13, the lower limit value Nd1 is set to a lower value as the accelerator opening AP decreases, whereas the lower limit value Nd1 is set to a higher value as the accelerator opening AP increases. Furthermore, the lower limit value Nd1 is set to a lower value as the vehicle speed VSP decreases, whereas the lower limit value Nd1 is set to a higher value as the vehicle speed VSP increases.

Subsequently, as illustrated in FIG. 12, the initial-transmission-gear-ratio setting unit 67 sets the initial transmission gear ratio Trf, when a transition is made to the stepped shift mode, based on the target transmission gear ratio Tr1 from the stepless-transmission-gear-ratio setting unit 60 and the lower limit value Nd1 from the lower-limit-value setting unit 73. In one example, when the shift mode is to be switched from the stepless shift mode to the stepped shift mode in accordance with downshifting, the initial-transmission-gear-ratio setting unit 67 sets the initial transmission gear ratio Trf as a target downshift transmission gear ratio from the fixed transmission gear ratios R1 to R6, so that a rotation-speed variation that is greater than or equal to the lower limit value Nd1 is ensured.

As illustrated in FIG. 14, if the accelerator pedal is pressed and the accelerator opening AP exceeds the opening threshold A1 during traveling in the stepless shift mode (reference sign f1), the shift mode is switched from the stepless shift mode to the stepped shift mode since the condition for switching the shift mode to the stepped shift mode is satisfied. In this case, the third fixed transmission gear ratio R3 is set (reference sign f2) as the initial transmission gear ratio Trf in the stepped shift mode, so that the rotation-speed variation becomes greater than or equal to the lower limit value Nd1.

In one example, the initial-transmission-gear-ratio setting unit 67 selects the third fixed transmission gear ratio R3 as a downshift candidate that is close to the current transmission gear ratio. Subsequently, the initial-transmission-gear-ratio setting unit 67 estimates the rotation-speed variation Ne3 when the transmission gear ratio is controlled to the fixed transmission gear ratio R3, and compares the rotation-speed variation Ne3 with the lower limit value Nd1. In the example illustrated in FIG. 14, since the rotation-speed variation Ne3 is greater than or equal to the rotation-speed variation Ne3, the initial-transmission-gear-ratio setting unit 67 sets the third fixed transmission gear ratio R3 as the initial transmission gear ratio Trf.

As described above, when the shift mode is to be switched from the stepless shift mode to the stepped shift mode, the initial transmission gear ratio Trf used in the stepped shift mode is set such that a rotation-speed variation that is greater than or equal to the lower limit value Nd1 is ensured. By setting the initial transmission gear ratio Trf as a target downshift transmission gear ratio in this manner, the initial transmission gear ratio Trf can be set away from the fixed transmission gear ratio R4 that is to serve as a subsequent target upshift transmission gear ratio, so that frequent upshifting in the stepped shift mode can be prevented, whereby the stepped shift mode can be appropriately executed.

Furthermore, as illustrated in FIG. 13, the lower limit value Nd1 is set to a lower value as the accelerator opening AP decreases, that is, as the accelerator-pedal operated amount decreases. On the other hand, the lower limit value Nd1 is set to a higher value as the accelerator opening AP increases, that is, as the accelerator-pedal operated amount increases. Moreover, the lower limit value Nd1 is set to a lower value as the vehicle speed VSP decreases, whereas the lower limit value Nd1 is set as a higher value as the vehicle speed VSP increases. Accordingly, in a region where the accelerator opening AP is high and a region where the vehicle speed VSP is high, the lower limit value Nd1 is set to a high value. Thus, when the vehicle 11 is to be accelerated by transitioning to the stepped shift mode, the engine rotation speed Ne can be increased by encouraging active downshifting, so that the vehicle 11 can be appropriately accelerated.

[Initial Transmission Gear Ratio in Stepped Shift Mode: Fourth Embodiment]

In the third embodiment illustrated in FIG. 14, the fixed transmission gear ratio R3, that is, a fixed transmission gear ratio set in advance for the stepped shift mode, is used as the initial transmission gear ratio Trf in the stepped shift mode. Alternatively, a fixed transmission gear ratio other than the fixed transmission gear ratios R1 to R6 may be set as the initial transmission gear ratio Trf as a target downshift transmission gear ratio. FIG. 15 illustrates another embodiment of a shift situation when the shift mode is switched from the stepless shift mode to the stepped shift mode. In FIG. 15, the shift situation according to the stepless shift mode is indicated by a dashed line, and the shift situation according to the stepped shift mode is indicated by a solid line.

As illustrated in FIG. 15, if the accelerator pedal is pressed and the accelerator opening AP exceeds the opening threshold A1 during traveling in the stepless shift mode (reference sign g1), the shift mode is switched from the stepless shift mode to the stepped shift mode since the condition for switching the shift mode to the stepped shift mode is satisfied. In this case, a fixed transmission gear ratio R20 is set by calculation (reference sign g2) as the initial transmission gear ratio Trf in the stepped shift mode, such that the rotation-speed variation matches the lower limit value Nd1. Accordingly, even when the fixed transmission gear ratio R20 other than the fixed transmission gear ratios R1 to R7 is calculated and this fixed transmission gear ratio R20 is set as the initial transmission gear ratio Trf, the initial transmission gear ratio Trf can be set away from the fixed transmission gear ratio R4 that is to serve as a subsequent target upshift transmission gear ratio, so that frequent upshifting in the stepped shift mode can be prevented, whereby the stepped shift mode can be appropriately executed.

The disclosure is not limited to the above embodiments, and various modifications are possible within the scope of the disclosure. For example, in the example illustrated in FIG. 4, seven fixed transmission gear ratios R1 to R7 are indicated as target transmission gear ratios to be used in the stepped shift mode. Alternatively, six or fewer fixed transmission gear ratios may be used, or eight or more fixed transmission gear ratios may be used. Furthermore, in the above description, the upshift threshold X1 is set based on the accelerator opening AP and the vehicle speed VSP. Alternatively, for example, the upshift threshold X1 may be set based on the accelerator opening AP alone, or the upshift threshold X1 may be set based on the vehicle speed VSP alone.

In the above description, the lower limit value Nu1 is set based on the engine rotation speed Ne and the vehicle speed VSP. Alternatively, for example, the lower limit value Nu1 may be set based on the engine rotation speed Ne alone, or the lower limit value Nu1 may be set based on the vehicle speed VSP alone. Furthermore, in the above description, the lower limit value Nd1 is set based on the accelerator opening AP and the vehicle speed VSP. Alternatively, for example, the lower limit value Nd1 may be set based on the accelerator opening AP alone, or the lower limit value Nd1 may be set based on the vehicle speed VSP alone.

In the above description, the transmission controller 41 is provided with the stepless-transmission-gear-ratio setting unit 60, the stepped-transmission-gear-ratio setting unit 61, the designated-transmission-gear-ratio setting unit 62, the shift-mode selecting unit 63, the control signal generator 64, the upshift-threshold setting unit 65, the lower-limit-value setting unit 66, and the initial-transmission-gear-ratio setting unit 67. Alternatively, for example, the setting units, the selecting unit, and the generator may be provided in another controller, or the setting units, the selecting unit, and the generator may be provided distributively in a plurality of controllers.

According to an embodiment of the disclosure, the transmission-gear-ratio setting unit estimates the variation in the engine rotation speed when the shift mode is to be switched from the stepless shift mode to the stepped shift mode, and sets a fixed transmission gear ratio, at which the variation in the engine rotation speed is higher than or equal to a lower limit value, as an initial transmission gear ratio. Accordingly, the stepped shift mode can be appropriately executed.

The invention claimed is:

1. A shift control device configured to control a continuously variable transmission to be coupled to an engine, the shift control device comprising:
   a stepless shift controller configured to execute a stepless shift mode as a shift mode and to control a transmission gear ratio of the continuously variable transmission in a stepless fashion;
   a stepped shift controller configured to execute a stepped shift mode as a shift mode and to control the continuously variable transmission using a plurality of fixed transmission gear ratios;
   a mode setting unit configured to switch the shift mode from the stepless shift mode to the stepped shift mode when a vehicle is to be accelerated in accordance with an operation performed on an accelerator pedal; and
   a transmission-gear-ratio setting unit configured to set an initial transmission gear ratio as a first target transmission gear ratio in the stepped shift mode when the shift mode is to be switched from the stepless shift mode to the stepped shift mode,
   wherein the transmission-gear-ratio setting unit estimates a variation in an engine rotation speed when the shift mode is to be switched from the stepless shift mode to the stepped shift mode, and sets a fixed transmission gear ratio, at which the variation in the engine rotation speed is greater than or equal to a lower limit value, as the initial transmission gear ratio.

2. The shift control device according to claim 1, wherein the transmission-gear-ratio setting unit sets the lower limit value on a basis of a vehicle speed when the shift mode is to be switched from the stepless shift mode to the stepped shift mode in accordance with upshifting.

3. The shift control device according to claim 2, wherein the lower limit value is set to a lower value as the vehicle speed increases and is set to a higher value as the vehicle speed decreases.

4. The shift control device according to claim 1, wherein the transmission-gear-ratio setting unit sets the lower limit value on the basis of the engine rotation speed when the shift mode is to be switched from the stepless shift mode to the stepped shift mode in accordance with upshifting.

5. The shift control device according to claim 2, wherein the transmission-gear-ratio setting unit sets the lower limit value on the basis of the engine rotation speed when the shift mode is to be switched from the stepless shift mode to the stepped shift mode in accordance with upshifting.

6. The shift control device according to claim 4, wherein the lower limit value is set to a higher value as the engine rotation speed increases and is set to a lower value as the engine rotation speed decreases.

7. The shift control device according to claim 5, wherein the lower limit value is set to a higher value as the engine rotation speed increases and is set to a lower value as the engine rotation speed decreases.

8. The shift control device according to claim 1, wherein the mode setting unit switches the shift mode from the stepless shift mode to the stepped shift mode in accordance with upshifting when an accelerator-pedal operated amount exceeds an operation threshold and the engine rotation speed exceeds a rotation threshold.

9. The shift control device according to claim 2, wherein the mode setting unit switches the shift mode from the stepless shift mode to the stepped shift mode in accordance with upshifting when an accelerator-pedal operated amount exceeds an operation threshold and the engine rotation speed exceeds a rotation threshold.

10. The shift control device according to claim 1, wherein the transmission-gear-ratio setting unit sets the lower limit value on a basis of a vehicle speed when the shift mode is to be switched from the stepless shift mode to the stepped shift mode in accordance with downshifting.

11. The shift control device according to claim 10, wherein the lower limit value is set to a higher value as the vehicle speed increases and is set to a lower value as the vehicle speed decreases.

12. The shift control device according to claim 1, wherein the transmission-gear-ratio setting unit sets the lower limit value on a basis of an accelerator-pedal operated amount when the shift mode is to be switched from the stepless shift mode to the stepped shift mode in accordance with downshifting.

13. The shift control device according to claim 10, wherein the transmission-gear-ratio setting unit sets the lower limit value on a basis of an accelerator-pedal operated amount when the shift mode is to be switched from the stepless shift mode to the stepped shift mode in accordance with downshifting.

14. The shift control device according to claim 11, wherein the transmission-gear-ratio setting unit sets the lower limit value on a basis of an accelerator-pedal operated amount when the shift mode is to be switched from the stepless shift mode to the stepped shift mode in accordance with downshifting.

15. The shift control device according to claim 12, wherein the lower limit value is set to a higher value as the accelerator-pedal operated amount increases and is set to a lower value as the accelerator-pedal operated amount decreases.

16. The shift control device according to claim 13, wherein the lower limit value is set to a higher value as the accelerator-pedal operated amount increases and is set to a lower value as the accelerator-pedal operated amount decreases.

17. The shift control device according to claim 14, wherein the lower limit value is set to a higher value as the accelerator-pedal operated amount increases and is set to a lower value as the accelerator-pedal operated amount decreases.

18. The shift control device according to claim 1, wherein the mode setting unit switches the shift mode from the stepless shift mode to the stepped shift mode in accordance with downshifting when an accelerator-pedal operated amount exceeds an operation threshold.

19. The shift control device according to claim 10,
wherein the mode setting unit switches the shift mode from the stepless shift mode to the stepped shift mode in accordance with downshifting when an accelerator-pedal operated amount exceeds an operation threshold.

20. The shift control device according to claim 11,
wherein the mode setting unit switches the shift mode from the stepless shift mode to the stepped shift mode in accordance with downshifting when an accelerator-pedal operated amount exceeds an operation threshold.

* * * * *